United States Patent [19]
Prosser

[11] 3,835,763
[45] Sept. 17, 1974

[54] METHOD AND APPARATUS FOR OBTAINING TOMATO JUICE WHILE MINIMIZING ENZYMIC ACTION

[75] Inventor: Walter L. Prosser, Indianapolis, Ind.

[73] Assignee: F. H. Langsenkamp Company, Indianapolis, Ind.

[22] Filed: Jan. 23, 1973

[21] Appl. No.: 326,116

[52] U.S. Cl. ................ 99/495, 99/483, 99/509, 426/489
[51] Int. Cl. ............................................. A23n 1/02
[58] Field of Search ............ 99/495, 509, 510, 513, 99/483; 426/489

[56] References Cited
UNITED STATES PATENTS

| | | | |
|---|---|---|---|
| 242,640 | 6/1881 | Heald | 99/510 |
| 792,262 | 6/1905 | Hay et al. | 99/510 X |
| 1,619,550 | 3/1927 | Thebaud et al. | 99/513 |
| 1,989,231 | 1/1935 | Gilliatt | 99/513 X |
| 2,109,398 | 2/1938 | McNitt | 99/513 X |
| 2,803,634 | 8/1957 | Chayen | 99/495 X |

FOREIGN PATENTS OR APPLICATIONS

| | | | |
|---|---|---|---|
| 729,200 | 5/1955 | Great Britain | 99/510 |

*Primary Examiner*—Stanley N. Gilreath
*Attorney, Agent, or Firm*—Woodward, Weikart, Emhardt & Naughton

[57] ABSTRACT

A method and apparatus for obtaining juices from tomatoes by heating the tomatoes to minimize enzymic action. The method includes the steps of heating the tomatoes to a minimum temperature of 190° Fahrenheit or higher and then chopping the tomatoes so as to allow the juices to flow into a vat. The apparatus has a rotatable heating element mounted within a vat receiving the tomatoes through a chute. A rotating cutter is mounted to the vat immediately adjacent the bottom open end of the chute and immediately above the heating element. A conveyor drops the tomatoes into the chute which are then heated by the heated juices circulated within the vat prior to cutting.

5 Claims, 2 Drawing Figures

3,835,763

METHOD AND APPARATUS FOR OBTAINING TOMATO JUICE WHILE MINIMIZING ENZYMIC ACTION

BACKGROUND OF THE INVENTION

1. Field of the Invention

This invention is in the field of methods and devices for producing juices from various fruits and vegetables.

2. Description of the Prior Art

It is known to cut, chop or mash various fruits and vegetables in order to collect the juices therefrom. It is also known that by cutting or chopping a fruit such as a tomato, enzymic action will immediately occur with the result of a 20 to 25 percent loss in the pectin content of the tomato. Disclosed herein is a method and apparatus for obtaining juices from tomatoes while simultaneously minimizing the enzymic action thereby increasing the amount of yield from the tomatoes. The method and apparatus disclosed herein also allows for the processing of a large volume of tomatoes.

SUMMARY OF THE INVENTION

One embodiment of the present invention is a method of obtaining juices from tomatoes while reducing enzymic action comprising the steps of heating tomatoes to a minimum temperature of 190 degrees Fahrenheit or higher, and breaking the skins of the tomatoes immediately subsequent to the heating step to allow juices within the tomatoes to escape.

It is an object of the present invention to provide a new and improved method for obtaining juices from tomatoes.

It is another object of the present invention to provide a new and improved apparatus for obtaining juices from tomatoes.

Yet another object of the present invention is to provide a method and apparatus for obtaining juices from tomatoes while minimizing enzymic action.

Related objects and advantages of the present invention will be apparent from the following description.

DESCRIPTION OF THE PREFERRED EMBODIMENT

Figure 1:
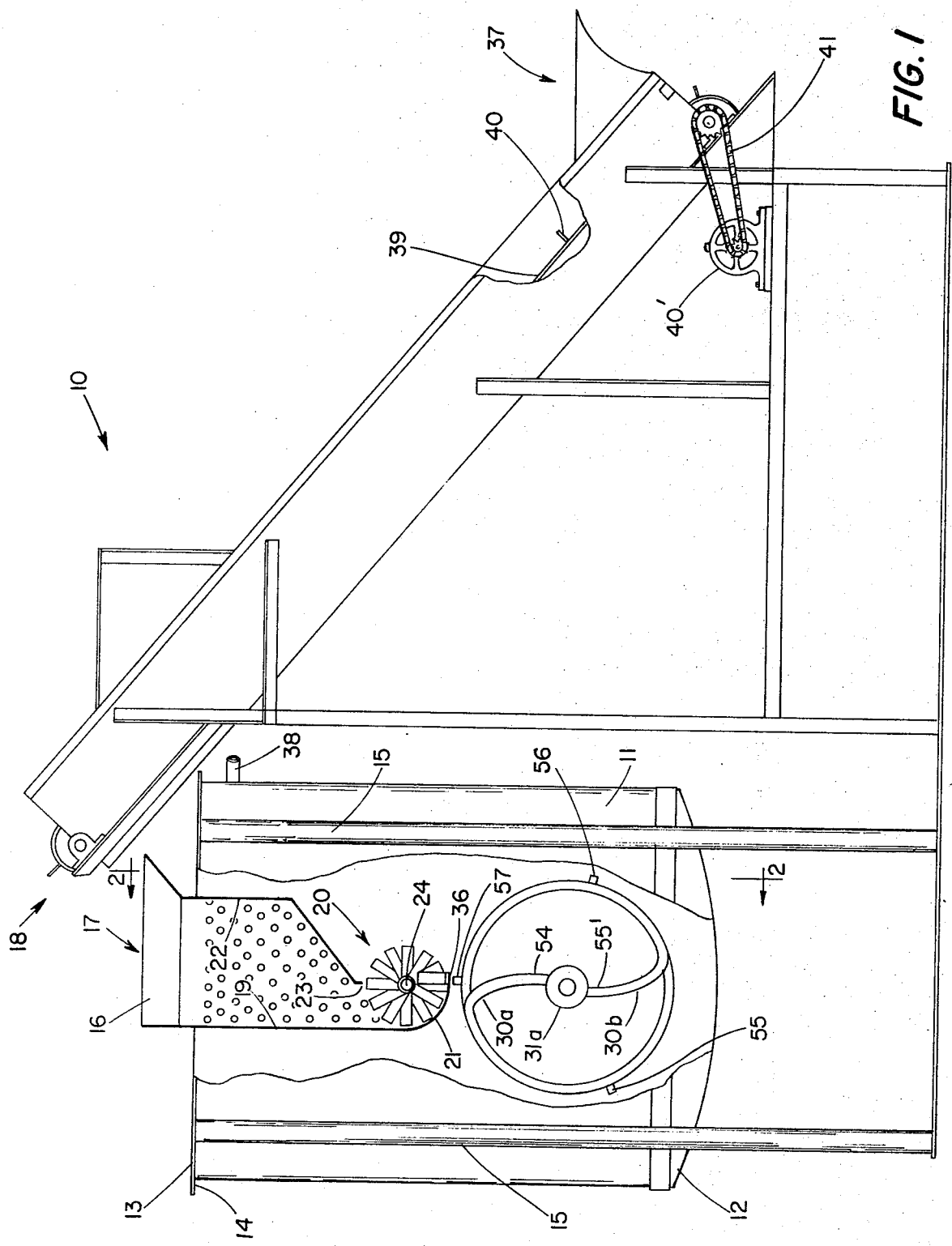
FIG. 1 is a fragmentary view of an apparatus incorporating the present invention.
Figure 2:
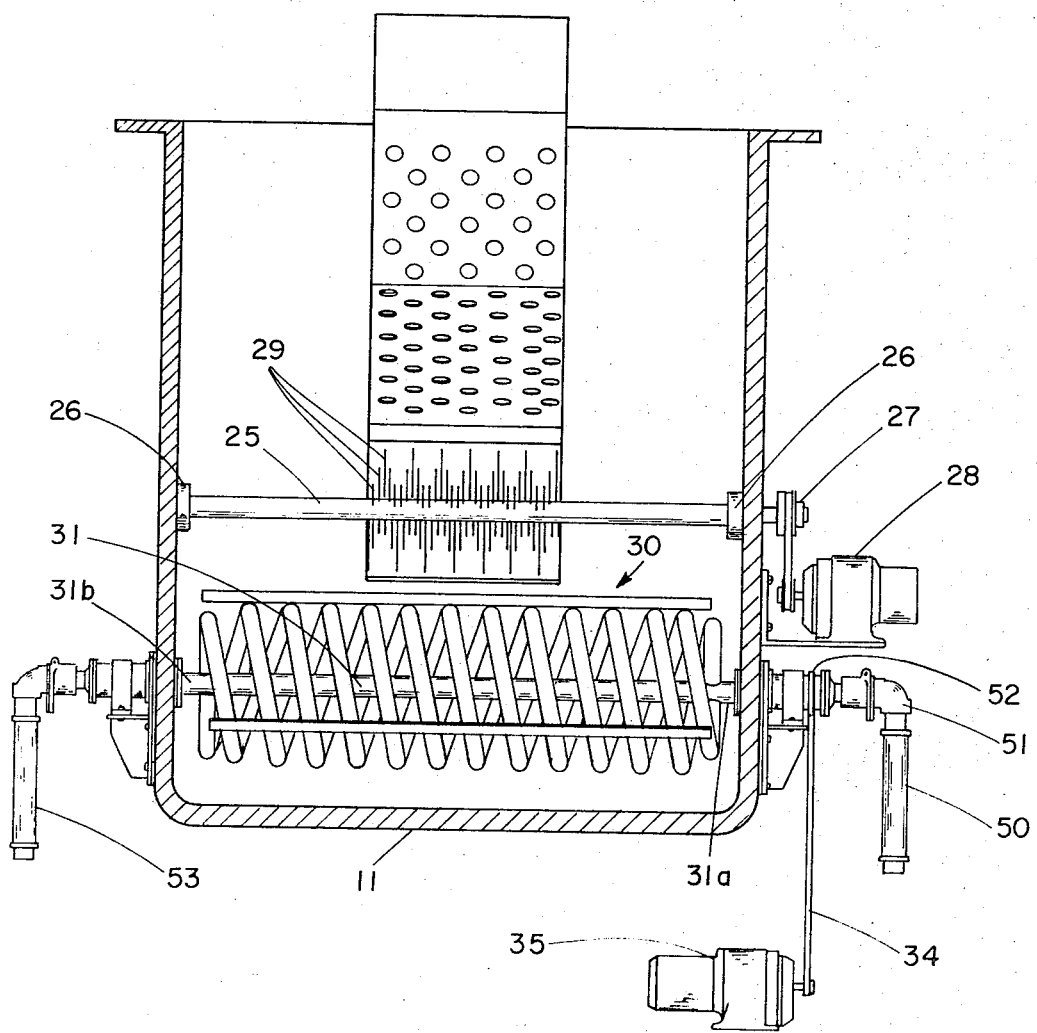
FIG. 2 is a cross sectional view taken along the line 2—2 of FIG. 1 and viewed in the direction of the arrows.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown an apparatus 10 for obtaining juices from tomatoes while reducing enzymic action. Apparatus 10 includes a vat 11 having a bottom end 12 and an open top end 13. Flange 14 is attached to vat 11 and extends therearound receiving the top ends of poles 15 for the mounting of vat 11. Chute 16 is mounted to the top end 13 of vat 11. Chute 16 includes an open top end 17 through which the tomatoes fall from conveyor 18. Side wall 19 of chute 16 extends vertically downward and then curves around cutter 20 at location 21. Side wall 19 terminates at a location 36. Side wall 22 of the chute extends vertically downward and then converges toward wall 19 terminating at location 23 immediately above cutter 20 and above the axis of rotation 24 of the cutter.

Cutter 24 includes a rod 25 which is rotatably mounted by bushings 26 to vat 11. Rod 25 extends sealingly through the side wall of the vat having a sprocket 27 mounted thereon which is drivingly coupled to motor 28. A plurality of blades 29 are fixedly mounted to rod 25 with each blade having an equal length so as to just clear the bottom edge 23 of wall 22 and the inside surface of the curved portion of wall 19 with the cutter rotating. Blades 29 extend radially outward from rod 25 with the blades being positioned under chute 16.

A heating element is rotatably mounted to the side walls of vat 11. The heating element includes a pair of hollow coils 30a and 30b which are helically wound about shaft 31 mounted to and between coupling 31a and 31b. Steam enters a flexible stationary hose 50 which is connected to rotary coupling 51 which is attached to sprocket 52 in driving engagement with chain 34 rotated by motor 35. Coupling 31a is connected by various fastening devices to sprocket 52 so that one revolution of the sprocket will cause one revolution of shaft 31. The opposite end of shaft 31 connected to coupling 31b is in turn coupled to various couplings and fastening devices to the outlet flexible hose 53. Thus, steam enters heating element 30 via hose 50 whereas condensate exits the heating element and returns back to the central heating system via hose 53. Suitable bearings are provided for the rotatable mounting of heating element 30. In addition, suitable packing is provided adjacent to the side walls of the vat through which the hollow rods extend which are coupled to heating element 30 and hoses 50 and 53.

Coupling 31a is hollow and is connected to a hollow rod projecting through the vat side wall and fixedly connected to sprocket 52. End 54 of coil 30a is connected to coupling 31a for receiving the steam. Likewise, end 55' of coil 30b is connected to coupling 31a for receiving the steam. Likewise, the opposite ends of coils 30a and 30b are connected to coupling 31b which in turn is connected to a hollow rod extending through the vat side wall for directing the condensate into flexible hose 53. Three agitator bars 55, 56 and 57 are mounted to heating element 30, 120° apart around the axis of rotation of the heating element. The agitator bars are fixedly mounted to spokes which project inwardly being fixedly mounted to the heating element. Thus, as the heating element is rotated, the agitator bars will increase the agitation of the juices within the vat.

All of the side walls of chute 16 are perforated to allow the heated juices within the vat to flow through the chute thereby heating the tomatoes within the chute. After the tomatoes are picked from the vine and cleaned, the tomatoes are positioned in hopper 37 and conveyed upwardly by conveyor 18 so as to be dropped into chute 16. In certain cases, the elevation of chute 16 will be such that conveyor 18 will not be required. Heating element 30 is connected to a source of steam. In one embodiment, the steam pressure was approximately 150 p.s.i. The heating element is rotated to provide for uniform heating throughout the vat. The juices within the vat are thereby heated and circulated through the vat as the heating element is rotated so as to pass through chute 16 to heat the tomatoes within the chute to a minimum temperature of 190 degrees Fahrenheit or higher. The perforated walls of chute 16 allow the juices to pass therethrough so as to be in direct contact with the tomatoes. The method includes the step of allowing the tomatoes to sink through chute 16 to cutter 20 which breaks the skins of each tomato by a cutting, chopping and mashing operation.

Many variations are contemplated and included in the apparatus disclosed herein in order to practice the method of the present invention. For example, the bottom end of the chute opens vertically; however, the bottom could also open horizontally. Conveyor 18 connected together with the vat extends upwardly from hopper 37 having a continuous conveyor belt 39 with projections 40 extending thereabove to prevent the tomatoes from rolling backward into the hopper. A suitable motor 40' is drivingly connected to mechanism 41 for the driving of the conveyor. Motors 28, 35 and 40' are independently controlled.

It will be obvious from the above description that the present invention provides a method of heating tomatoes with tomato juice in order to reduce the pectin loss. Likewise, it will be obvious that the above description describes a new and novel method and apparatus wherein a tomato chopper is located within a vat at a position below the liquid level of the juices collected within the vat.

It will be obvious from the above description that the present invention provides a new and improved method for obtaining juices from tomatoes while maintaining enzymic action. It will be further obvious from the above description that the present invention provides a new and improved apparatus for obtaining juices from tomatoes while minimizing enzymic action.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. An apparatus for obtaining juices from tomatoes while reducing enzymic action comprising:
   a vat;
   first means connected to said vat being operable to heat tomatoes placed therein to a minimum temperature of 190 degrees Fahrenheit or higher;
   a chute mounted in said vat to receive said tomatoes and having a bottom open end; and,
   second means mounted in said vat beneath said bottom end of said chute being operable to break the skins of said tomatoes.

2. The apparatus of claim 1 wherein:
   said first means includes a heating element rotatably mounted to said vat.

3. The apparatus of claim 2 wherein:
   said second means includes a cutter with an axis of rotation with said cutter being rotatably mounted to said vat immediately above said heating element.

4. The apparatus of claim 3 wherein:
   said chute is mounted atop said vat and has a top opened end and a bottom opened end, said bottom end opens vertically with said cutter positioned in said bottom end, said chute includes a first perforated side wall and a second perforated side wall with said second side wall extending inwardly downward toward said first side wall and narrowing said chute toward said bottom end, said second side wall terminating immediately above said axis of rotation with said first side wall extending downwardly past said second side wall, curving around said cutter and terminating immediately beneath said cutter, said cutter rotates through a circular pattern trapping said tomatoes between said cutter and said first side wall.

5. The apparatus of claim 4 and further comprising:

a conveyor including a hopper connected to said vat, said conveyor having a top end emptying into said chute which projects above said vat.

* * * * *